United States Patent
Ermans et al.

(10) Patent No.: US 11,501,206 B2
(45) Date of Patent: Nov. 15, 2022

(54) METHOD AND MACHINE LEARNING SYSTEM FOR DETECTING ADVERSARIAL EXAMPLES

(71) Applicant: NXP B.V., Eindhoven (NL)

(72) Inventors: Brian Ermans, 's-Hertogenbosch (NL); Peter Doliwa, Hamburg (DE); Christine van Vredendaal, Veldhoven (NL)

(73) Assignee: NXP B.V., Eindhoven (NL)

( * ) Notice: Subject to any disclaimer, the term of this patent is extended or adjusted under 35 U.S.C. 154(b) by 726 days.

(21) Appl. No.: 16/576,830

(22) Filed: Sep. 20, 2019

(65) Prior Publication Data

US 2021/0089957 A1    Mar. 25, 2021

(51) Int. Cl.
*G06N 20/00*    (2019.01)
*G06K 9/62*    (2022.01)
*G06N 3/08*    (2006.01)

(52) U.S. Cl.
CPC ........... *G06N 20/00* (2019.01); *G06K 9/6257* (2013.01); *G06K 9/6262* (2013.01); *G06K 9/6267* (2013.01); *G06N 3/08* (2013.01)

(58) Field of Classification Search
CPC ........ G06N 20/00; G06N 3/08; G06N 3/0454; G06K 9/6257; G06K 9/6262; G06K 9/6267
See application file for complete search history.

(56) References Cited

U.S. PATENT DOCUMENTS

| | | | |
|---|---|---|---|
| 10,007,866 B2 | 6/2018 | Criminisi et al. | |
| 10,824,122 B2* | 11/2020 | Mummadi | G06T 7/10 |
| 2019/0017929 A1* | 1/2019 | Kumagai | G01N 33/383 |
| 2019/0155284 A1 | 5/2019 | Zavesky et al. | |

(Continued)

FOREIGN PATENT DOCUMENTS

| | | |
|---|---|---|
| WO | PCT-2018231708 A2 | 12/2018 |
| WO | PCT-2019014487 A1 | 1/2019 |

OTHER PUBLICATIONS

Goodfellow, Ian J. et al.; "Explaining and Harnessing Adversarial Examples;" Dec. 20, 2014; arXiv.org > stat > arXiv:1412.6572.

(Continued)

*Primary Examiner* — Wesley J Tucker
(74) *Attorney, Agent, or Firm* — Daniel D. Hill

(57) ABSTRACT

A method and machine learning system for detecting adversarial examples is provided. A first machine learning model is trained with a first machine learning training data set having only training data samples with robust features. A second machine learning model is trained with a second machine learning training data set, the second machine learning training data set having only training data samples with non-robust features. A feature is a distinguishing element in a data sample. A robust feature is more resistant to adversarial perturbations than a non-robust feature. A data sample is provided to each of the first and second trained machine learning models during an inference operation. if the first trained machine learning model classifies the data sample with high confidence, and the second trained machine learning model classifies the data sample differently with a high confidence, then the data sample is determined to be an adversarial example.

20 Claims, 3 Drawing Sheets

(56) References Cited

U.S. PATENT DOCUMENTS

| | | | | |
|---|---|---|---|---|
| 2019/0238568 A1* | 8/2019 | Goswami | | G06N 20/10 |
| 2019/0362269 A1* | 11/2019 | Barad | | G06N 20/20 |
| 2020/0327443 A1* | 10/2020 | Van Vredendaal | | G06N 20/00 |
| 2022/0094709 A1* | 3/2022 | Sharma | | G06N 5/04 |
| 2022/0114259 A1* | 4/2022 | Ludwig | | G06N 20/00 |
| 2022/0143240 A1* | 5/2022 | Murphy | | F21V 29/70 |
| 2022/0180157 A1* | 6/2022 | Eykholt | | G06N 3/082 |
| 2022/0292345 A1* | 9/2022 | Barsopia | | G06N 3/0454 |

OTHER PUBLICATIONS

Guo, Chuan et al.; "Countering Adversarial Images Using Input Transformations;" Oct. 31, 2017; arXiv.org > cs > arXiv:1711.00117.

Ilyas, Andrew et al.; "Adversarial Examples are Not Bugs, They are Features;" May 6, 2019; arXiv.org > stat > arXiv:1905.02175.

Li, Shuangtao et al.; "Learning More Robust Features with Adversarial Training;" Apr. 20, 2018; arXiv.org > cs > arXiv:1804.07757.

Li, Xin et al.; "Adversarial Examples Detection in Deep Networks with Convolutional Filter Statistics;" Dec. 22, 2016; arXiv.org > cs > arXiv:1612.07767.

Rouhani, Bita Darvish et al.; "DeepFense: Online Accelerated Defense Against Adversarial Deep Learning;" Sep. 8, 2017; arXiv.org > cs > arXiv:1709.02538.

Szegedy, Christian et al.; "Intriguing Properties of Neural Networks;" Dec. 21, 2013; arXiv.org > cs > arXiv:1312.6199.

Gong, Zhitao et al.; "Adversarial and Clean Data are Not Twins"; arXiv.org > cs > arXiv:1704.04960; Submitted Apr. 17, 2017.

Meng, Dongyu et al.; "MagNet: a Two-Pronged Defense against Adversarial Examples"; arXiv.org > cs > arXiv:1705.09064; Submitted May 25, 2017, Last Revised Sep. 11, 2017; Accepted at the ACM Conference on Computer and Communications Security (CCS), Oct. 30-Nov. 3, 2017, Dallas, Texas.

Rakin, Adnan Siraj et al.; "Defense-Net: Defend Against a Wide Range of Adversarial Attacks through Adversarial Detector"; Published in 2019 IEEE Computer Society Annual Symposium on VLSI (ISVLSI); Date of Conference Jul. 15-17, 2019, Miami, FL; DOI: 10.1109/ISVLSI.2019.00067.

Wang, Jingyi et al., "Adversarial Sample Detection for Deep Neural Network through Model Mutation Testing"; Published in 2019 IEEE/ACM 41st International Conference on Software Engineering (ICSE); Date of Conference May 25-31, 2019, Montreal, Canada; DOI: 10.1109/ICSE.2019.00126.

* cited by examiner

METHOD AND MACHINE LEARNING SYSTEM FOR DETECTING ADVERSARIAL EXAMPLES

BACKGROUND

Field

This disclosure relates generally to machine learning, and more particularly, to a method and machine learning system for detecting adversarial examples.

Related Art

Machine learning is becoming more widely used in many of today's applications, such as applications involving forecasting and classification. Generally, a machine learning (ML) model is trained, at least partly, before it is used. Training data is used for training an ML model. Machine learning models may be classified by how they are trained. Supervised learning, unsupervised learning, semi-supervised learning, and reinforcement learning are examples of training techniques. The effectiveness of the ML model is influenced by its accuracy, execution time, storage requirements, and the quality of the training data. The expertise, time, and expense required for creating and training a machine learning model using this training data results in the ML model being a valuable asset.

Protecting an ML model from attacks has become a problem. One type of attack involves the use of adversarial examples. This attack inputs modified data samples (adversarial examples) to cause the machine learning model to classify the modified data sample incorrectly. The modifications, or perturbations, can be small pixel changes to features of, e.g., an image, that are imperceptible to the human eye so that a person will not mischaracterize the image, but a machine learning model will. A machine learning model can be trained to classify some adversarial examples correctly. However, this training may impact the accuracy of the machine learning model on non-adversarial data samples.

Therefore, a need exists for a method to detect adversarial examples without impacting the accuracy of a machine learning model.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
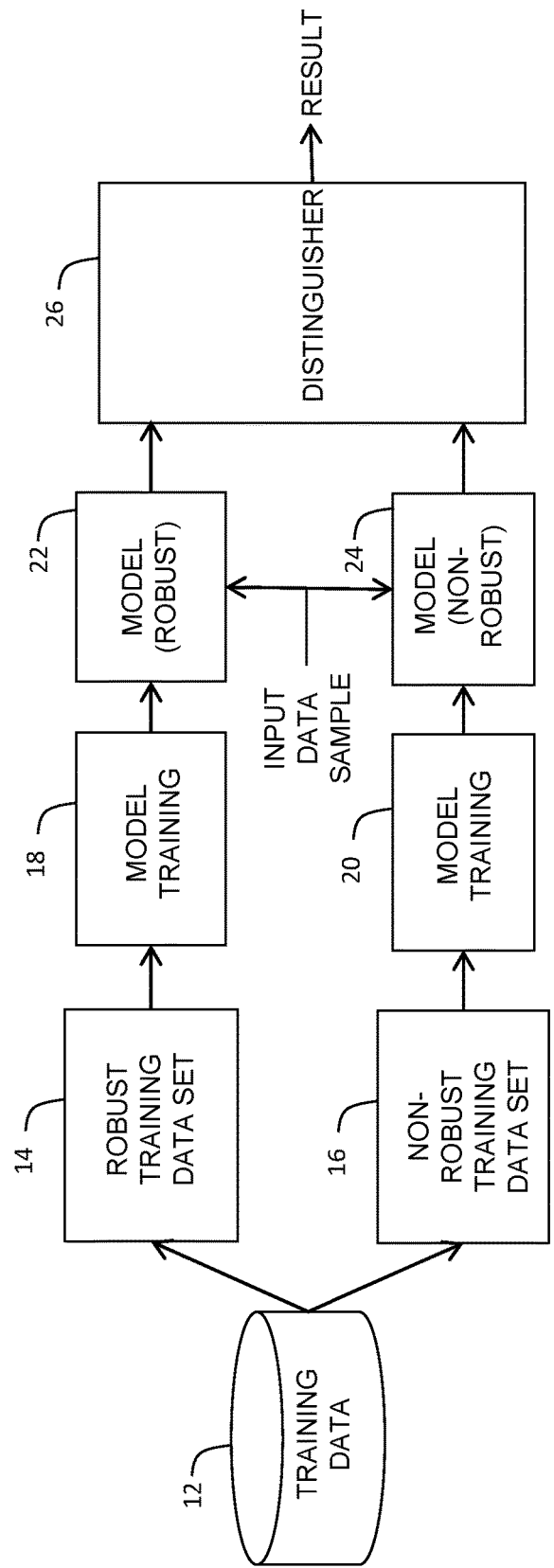
FIG. 1 illustrates a machine learning system in accordance with an embodiment.

Generally, there is provided, a method and system for detecting adversarial examples. Adversarial examples are data samples that include intentionally perturbed features that cause a ML model to incorrectly classify the adversarial examples. The adversarial examples may be provided as an attack against a ML model to cause the ML model to provide an incorrect result. As used herein, a feature is a distinguishing element of a data sample that is used by a ML model to classify the data sample. Features of a data sample can be characterized as robust features and non-robust features. A robust feature is a feature of a data sample that cannot be perturbed so that an ML algorithm will misclassify the input data sample without the perturbation being evident to human perception. A robust feature is more resistant to being perturbed with non-observable perturbations than a non-robust feature. A non-robust feature can be perturbed with human non-observable perturbations to create an adversarial example. A non-robust feature in a data sample may be virtually undetectable by a human eye yet can be used to cause a ML model to incorrectly classify a data sample. To detect adversarial examples, the method includes providing a first training data set having only data samples with robust features and providing a second training data set having only data samples with non-robust features. A ML model is trained with the first training data set having robust features to create a first trained machine learning model. The ML model is trained with the second training data set having non-robust features to create a second trained ML model. The ML model is also trained with normal training data having no protections against adversarial examples to provide a third trained ML model. The third trained ML model is the model requiring protection from adversarial examples. After training, during inference operation, a data sample intended for the third ML model having normal training is first provided to the first and second trained ML models. The first and second ML models pre-screen the data sample to determine if the data sample is an adversarial example. If the first trained ML model classifies the data sample with high confidence, and the second trained ML model classifies the data sample differently, also with high confidence, the data sample is determined to be an adversarial example. If the data sample is determined to be an adversarial example, an indication may be output. Also, the data sample may be prevented from being classified by the third ML model. If, however, the first and second trained ML models each classifies the data sample the same, with similar confidence levels, then the data sample is determined to not be an adversarial sample, and the data sample can be provided to the third ML model for normal classification of the data sample.

The method is used to protect a ML model from attacks using adversarial examples. The method is especially useful for protecting machine learning models used in security and safely related applications, where the risk of loss and/or injury is high.

In accordance with an embodiment, there is provided, a method for detecting adversarial examples, the method including: training a first machine learning model with a first machine learning training data set having only training data samples with robust features, to produce a first trained machine learning model; training a second machine learning model with a second machine learning training data set, the second machine learning training data set having only training data samples with non-robust features to produce a second trained machine learning model, wherein a feature is a distinguishing element in a data sample, and wherein a robust feature is more resistant to adversarial perturbations than a non-robust feature; and providing a data sample to each of the first and second trained machine learning models during an inference operation, if the first trained machine learning model classifies the data sample with high confidence, and the second trained machine learning model classifies the data sample differently with a high confidence, then the data sample is determined to be an adversarial example. The first and second machine learning models may include the same machine learning algorithm. The first and second machine learning models may be based on a neural network. If the first and second trained machine learning models classify the data sample the same, the data sample may be determined to not be an adversarial example. The method may further include training a third machine learning model with a third training data set, the third training data set may be not having any protections against adversarial examples. The method may further include providing the data sample to the third trained machine learning model if the data sample is determined not to be an adversarial example. The data sample may be an image having a non-robust feature, the non-robust feature being imperceptible by a human being.

In another embodiment, there is provided, a method for detecting adversarial examples, the method including: compiling a set of robust features and a set of non-robust features, wherein a feature is a distinguishing element in a data sample, and wherein a robust feature is more resistant to adversarial perturbations than a non-robust feature; creating a first machine learning training data set having only training data samples with the robust features; creating a second machine learning training data set having only training data samples with the non-robust features; training a first machine learning model with the first machine learning training data set to produce a first trained machine learning model; training a second machine learning model with the second machine learning training data set to produce a second trained machine learning model; and providing a data sample to each of the first and second trained machine learning models during an inference operation, if the first trained machine learning model classifies the data sample with high confidence, and the second trained machine learning model classifies the data sample differently with high confidence, the data sample is determined to be an adversarial example. If the first trained machine learning model and the second trained machine learning model classify the data sample the same, the data sample may be determined to not be an adversarial example. The first and second trained machine learning models may both include the same machine learning algorithm. The method may further include providing the data sample that is determined to not be an adversarial example to a third trained machine learning model that has been trained without any protections against adversarial examples. The first, second, and third machine learning models may all include a machine learning algorithm for classifying images. The method may further include providing an indication of an attack in response to the adversarial example being detected. The first, second, and third machine learning models may all include a neural network.

In yet another embodiment, there is provided, a machine learning system including: a first trained machine learning model trained with a first training data set including only a plurality of robust features, the first trained machine learning model having an input for receiving an input data sample, and an output for providing a first output classification in response to receiving the input data sample; a second trained machine learning model trained with a second training data set, the second training data set including only a plurality of non-robust features, the second trained machine learning model having an output for providing a second output classification in response to receiving the input data sample, wherein a feature is characterized as being a distinguishing element of a data sample, and wherein a robust feature is more resistant to adversarial perturbations than a non-robust feature; and a distinguisher coupled to an output of both the first and second trained machine learning models for receiving the first and second output classifications, if the first trained machine learning model classifies the data sample with high confidence, and the second trained machine learning model classifies the data sample differently than the first trained machine learning model and with high confidence, the data sample is determined to be an adversarial example. If the first and second trained machine learning models classify the data sample the same, the data sample may be determined to not be an adversarial example. The machine learning system may further include a third trained machine learning model trained with a third training data set, wherein the third training data set not trained to have any protections against adversarial examples. If the first and second trained machine learning models classify the data sample the same, the data sample may be determined to not be an adversarial example and the data sample is provided to the third trained machine learning model for classification. The first and second trained machine learning models may both use the same machine learning algorithm. The first and second trained machine learning models may include a neural network.

FIG. 1 illustrates machine learning system 10 in accordance with an embodiment. FIG. 1 shows training data 12, robust training data set 14, non-robust training data set 16, model training portions 18 and 20, models 22 and 24, and distinguisher 26. Training data 12 is split into two training data sets and is used for training a ML model. The ML model may include a convolutional neural network-based machine learning algorithm for prediction and classification. In other embodiments, the ML model may be different. Training data set 14 includes training data samples having only robust features, and training data set 16 includes training data samples having only non-robust features. As mentioned above, robust features are features of a data sample that are more resistant to being made into an adversarial example than non-robust features. One way to distinguish a robust feature from a non-robust feature, is that a robust feature is difficult to alter without a human noticing the alteration. That is, the perturbation is imperceptible, or nearly imperceptible, to a human. Examples of robust features might include fur on an animal, round shapes like wheels, and triangular shapes like ears on an animal. Non-robust features might include a noise pattern in an image. The non-robust feature, such as a noise pattern of only a few pixels in an image, can be exploited by an attacker to create an adversarial example.

The robust training data set 14 and the non-robust training data set 16 may be created using various techniques. In one technique, a model may be trained using adversarial training to generate a new model. The adversarial training may include all known adversarial example attacks. The new model learns to ignore the perturbations made by the known adversarial examples. By observing which features are influencing the model prediction in both the original images and the perturbed images during the adversarial training of the new model, the robust features not influenced by adversarial perturbations can be identified. The two sets of features can then be used to create the robust and non-robust training data sets. The robust and non-robust training sets may also be produced another way in another embodiment. Note that in another embodiment, training data set 12 may first be divided into subsets of training data, for example, each subset may include only samples from a particular classification type before determining robust and non-robust features.

Training data sets 14 and 16 may be disjoint and cover all features, but may also be overlapping, or missing features of the original training data 12. Training data set 14 is then used in ML model training 18 to produce trained robust model 22. Training data set 16 is used in ML model training 20 to produce trained non-robust model 24. Trained ML models 22 and 24 are both based on the same ML algorithm. Also, in one embodiment, the ML algorithm may include a neural network. Trained robust model 22 and trained non-robust model 24 are then used to determine if an input data sample, such as an image, is an adversarial example. The detected adversarial example can then be flagged and prevented from being provided to an ML model that has being trained using normal training data, where the normal training data has no protections against adversarial examples. However, if the input data sample is determined to not be an adversarial example, then the input data sample is safe to be provided to the ML model that is being protected.

During inference operation of ML models 22 and 24, an input data sample (INPUT DATA SAMPLE) is provided to both ML models 22 and 24. Both ML models classify the input data sample and provide a classification result for the INPUT DATA SAMPLE to inputs of distinguisher 26. Distinguisher 26 determines if the INPUT DATA SAMPLE is an adversarial example, and then provides an indication (RESULT). The classification outputs from models 22 and 24 may include, for example, a classification category and a confidence level in the provided classification category. From the classification outputs, distinguisher 26 determines if the INPUT DATA SAMPLE is an adversarial example. For example, if model 22 classifies the INPUT DATA SAMPLE as belonging to a class "A" with relatively high confidence, and if model 24 classifies the INPUT DATA SAMPLE as belonging to a class "B", also with relatively high confidence, then the INPUT DATA SAMPLE may be determined to be an adversarial example. The INPUT DATA SAMPLE can then be prevented from being provided to a model (not shown) trained normally without any protections against adversarial examples. In another example, if models 22 and 24 both classify the INPUT DATA SAMPLE the same, and with confidence levels that are similar, then the INPUT DATA SAMPLE is determined by distinguisher 26 to not be an adversarial example and is safe to be input to a model trained with training data 12 having no protections against adversarial examples. In other embodiments, the determination as to whether or not an input data sample is an adversarial example may be accomplished differently. Also, in another embodiment, an input data sample that is determined to be an adversarial example may be simply flagged as an adversarial example. Also, when an attack is detected, the attack may be acted upon by either requiring a manual check by, e.g., a person, a ML facial recognition system, or simply shutting down the system. In another example, an attacked ML model may be throttled to slow down the rate of output predictions from the attacked ML model.

In the above described embodiment, it is possible that a misprediction, or a mistake in classification, will result in a false determination. For example, it is possible that one of models 22 and 24 simply misclassify the input data sample. If the confidence levels of the predictions are close together, then the RESULT of distinguisher 26 may be a false positive or a false negative. However, a big difference in the confidence levels of the predictions of models 22 and 24 may indicate a true positive detection. In case there is doubt in a determination, an output of a model trained on training data 12 may be taken into account to decide whether or not an input data sample is an adversarial example. In another embodiment, the value of the confidence level that will cause the indication to be provided can be adjusted by a user. The adjustment decision may be impacted by weighing the desirability of false negative results (e.g., safety concerns) versus false positive results.

In another embodiment, multiple robust models may be created using different adversarial training methods. The use of multiple robust models may allow the type of adversarial attack to be detected. Also, by using models that are trained with different adversarial training methods, the detection of adversarial examples may be performed more accurately.

Figure 2:
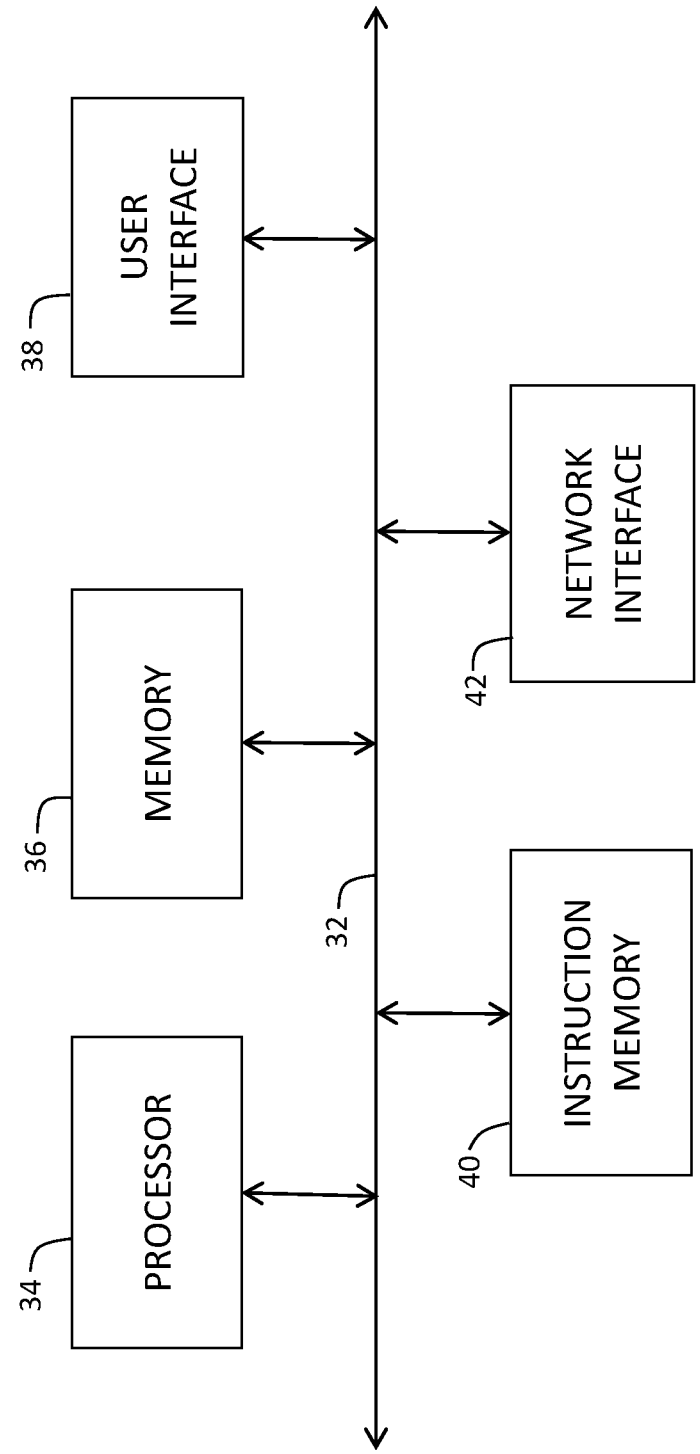
FIG. 2 illustrates a data processing system useful for implementing the machine learning system of FIG. 1.

FIG. 2 illustrates data processing system 30 for implementing machine learning system 10 of FIG. 1. Data processing system 30 may be implemented on one or more integrated circuits and may be used in an implementation of the described embodiments. Data processing system 30 includes bus 32. Connected to bus 32 is processor 34, memory 36, user interface 38, instruction memory 40, and network interface 42. Processor 34 may be any hardware device capable of executing instructions stored in memory 36 or instruction memory 40. For example, processor 34 may execute the machine learning algorithms. Processor 34 may have multiple processing cores. Processor 34 may be, for example, a microprocessor, field programmable gate array (FPGA), application-specific integrated circuit (ASIC), or similar device. Processor 34 may be implemented in a secure hardware element and may be tamper resistant.

Memory 36 may be any kind of memory, such as for example, L1, L2, or L3 cache or system memory. Memory 36 may include volatile memory such as static random-access memory (SRAM) or dynamic RAM (DRAM), or may include non-volatile memory such as flash memory, read only memory (ROM), or other volatile or non-volatile memory. Also, memory 36 may be implemented in a secure hardware element. Alternately, memory 86 may be a hard drive implemented externally to data processing system 30. In one embodiment, memory 36 is used to store weight matrices for the ML model.

User interface 38 may be connected to one or more devices for enabling communication with a user such as an administrator. For example, user interface 38 may be enabled for coupling to a display, a mouse, a keyboard, or other input/output device. Network interface 42 may include one or more devices for enabling communication with other hardware devices. For example, network interface 42 may include, or be coupled to, a network interface card (NIC) configured to communicate according to the Ethernet protocol. Also, network interface 42 may implement a TCP/IP stack for communication according to the TCP/IP protocols. Data samples for classification may be input via network interface 42, or similar interface. Various other hardware or configurations for communicating are available.

Instruction memory 40 may include one or more machine-readable storage media for storing instructions for execution by processor 34. In other embodiments, both memories 36 and 40 may store data upon which processor 34 may operate. Memories 36 and 40 may also store, for example, encryption, decryption, and verification applications. Memories 36 and 40 may be implemented in a secure hardware element and be tamper resistant.

Figure 3:
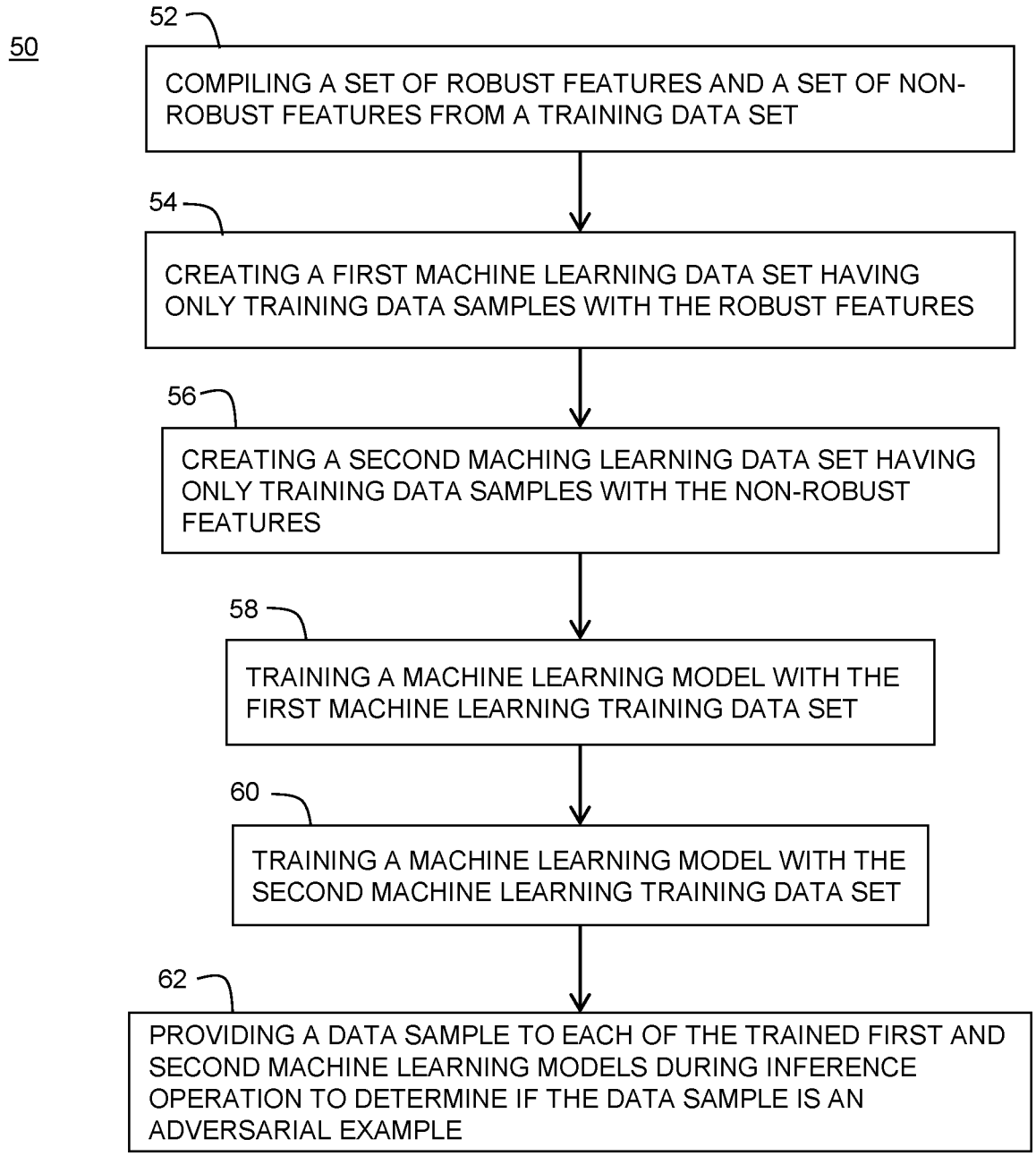
FIG. 3 illustrates a flow chart of a method for detecting adversarial examples in accordance with an embodiment.

FIG. 3 illustrates a flow chart of a method 50 for detecting adversarial examples in accordance with an embodiment. Method 50 begins at step 52. At step 52, a set of robust features and a set of non-robust features are compiled from a training data set. At step 54, a first ML training data set is created having only the robust features. At step 56, a second ML data set is created having only the non-robust features. The first and second ML data sets are provided for use in training ML models for use in detecting adversarial examples. At step 58, a machine learning model is trained with the first ML data set to create a first trained robust ML model. At step 60, a machine learning model is trained with the second ML data set to create a second trained non-robust ML model. Both models use the same ML algorithm. At step 62, during an inference operation, the first and second ML models are used to detect if an input data sample is an adversarial example. If the first trained robust machine learning model classifies the input data sample with high confidence, and the second trained non-robust machine learning model classifies the data sample differently and with a high confidence, the input data sample is determined to be an adversarial example. If the first trained robust machine learning model and the first trained non-robust machine learning model classifies the data sample the same, then the data sample is determined to not be an adversarial example, and the data sample can be provided to a model trained with training data having no protections against adversarial examples. Thus, a ML model with no protections against adversarial examples can be protected from adversarial examples.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for detecting adversarial examples, the method comprising:
    training a first machine learning model with a first machine learning training data set having only training data samples with robust features, to produce a first trained machine learning model;
    training a second machine learning model with a second machine learning training data set, the second machine learning training data set having only training data samples with non-robust features to produce a second trained machine learning model, wherein a feature is a distinguishing element in a data sample, and wherein a robust feature is more resistant to adversarial perturbations than a non-robust feature; and
    providing a data sample to each of the first and second trained machine learning models during an inference operation, if the first trained machine learning model classifies the data sample with high confidence, and the second trained machine learning model classifies the data sample differently with a high confidence, then the data sample is determined to be an adversarial example.

2. The method of claim 1, wherein the first and second machine learning models include the same machine learning algorithm.

3. The method of claim 1, wherein the first and second machine learning models are based on a neural network.

4. The method of claim 1, wherein if the first and second trained machine learning models classify the data sample the same, the data sample is determined to not be an adversarial example.

5. The method of claim 1, further comprising training a third machine learning model with a third training data set, the third training data set not having any protections against adversarial examples.

6. The method of claim 5, further comprising providing the data sample to the third trained machine learning model if the data sample is determined not to be an adversarial example.

7. The method of claim 1, wherein the data sample is an image having a non-robust feature, the non-robust feature being imperceptible by a human being.

8. A method for detecting adversarial examples, the method comprising:
    compiling a set of robust features and a set of non-robust features, wherein a feature is a distinguishing element in a data sample, and wherein a robust feature is more resistant to adversarial perturbations than a non-robust feature;
    creating a first machine learning training data set having only training data samples with the robust features;
    creating a second machine learning training data set having only training data samples with the non-robust features;
    training a first machine learning model with the first machine learning training data set to produce a first trained machine learning model;
    training a second machine learning model with the second machine learning training data set to produce a second trained machine learning model; and
    providing a data sample to each of the first and second trained machine learning models during an inference operation, if the first trained machine learning model classifies the data sample with high confidence, and the second trained machine learning model classifies the data sample differently with high confidence, the data sample is determined to be an adversarial example.

9. The method of claim 8, wherein if the first trained machine learning model and the second trained machine learning model classify the data sample the same, the data sample is determined to not be an adversarial example.

10. The method of claim 9, wherein the first and second trained machine learning models both include the same machine learning algorithm.

11. The method of claim 10, further comprising providing the data sample that is determined to not be an adversarial example to a third trained machine learning model that has been trained without any protections against adversarial examples.

12. The method of claim 8, wherein the first, second, and third machine learning models all include a machine learning algorithm for classifying images.

13. The method of claim 8, further comprising providing an indication of an attack in response to the adversarial example being detected.

14. The method of claim 8, wherein the first, second, and third machine learning models all include a neural network.

15. A machine learning system comprising:
- a non-transitory computer readable medium storing a computer program, wherein the computer program, when executed by a processor, causes the processor to implement operations, the operations comprise:
- a first trained machine learning model trained with a first training data set including only a plurality of robust features, the first trained machine learning model having an input for receiving an input data sample, and an output for providing a first output classification in response to receiving the input data sample;
- a second trained machine learning model trained with a second training data set, the second training data set including only a plurality of non- robust features, the second trained machine learning model having an output for providing a second output classification in response to receiving the input data sample, wherein a feature is characterized as being a distinguishing element of a data sample, and wherein a robust feature is more resistant to adversarial perturbations than a non-robust feature; and
- a distinguisher coupled to an output of both the first and second trained machine learning models for receiving the first and second output classifications, if the first trained machine learning model classifies the data sample with high confidence, and the second trained machine learning model classifies the data sample differently than the first trained machine learning model and with high confidence, the data sample is determined to be an adversarial example.

16. The machine learning system of claim 15, wherein if the first and second trained machine learning models classify the data sample the same, the data sample is determined to not be an adversarial example.

17. The machine learning system of claim 15, further comprising a third trained machine learning model trained with a third training data set, wherein the third training data set not trained to have any protections against adversarial examples.

18. The machine learning model of claim 17, wherein if the first and second trained machine learning models classify the data sample the same, the data sample is determined to not be an adversarial example and the data sample is provided to the third trained machine learning model for classification.

19. The machine learning model of claim 15, wherein the first and second trained machine learning models both use the same machine learning algorithm.

20. The machine learning model of claim 15, wherein the first and second trained machine learning models include a neural network.

* * * * *